(12) United States Patent
Park et al.

(10) Patent No.: US 7,883,069 B2
(45) Date of Patent: Feb. 8, 2011

(54) LIFTING DEVICE OF A DISPLAY APPARATUS

(75) Inventors: Jae Hoo Park, Suwon-si (KR); Boo Keun Yoon, Suwon-si (KR); Sang Hak Kim, Suwon-si (KR); Gi Hyun Tae, Yongin-si (KR); Bong Joo Kim, Suwon-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 0 days.

(21) Appl. No.: 12/437,157

(22) Filed: May 7, 2009

(65) Prior Publication Data

US 2009/0278008 A1 Nov. 12, 2009

(51) Int. Cl.
*A47H 1/10* (2006.01)
(52) U.S. Cl. .................. 248/328; 248/489; 248/493
(58) Field of Classification Search ............ 248/231.91, 248/328, 329, 330.1, 332, 489, 492, 493; 40/601, 757
See application file for complete search history.

(56) References Cited

U.S. PATENT DOCUMENTS

| | | | | |
|---|---|---|---|---|
| 769,695 | A * | 9/1904 | Gurr ........................ 248/492 |
| 1,057,484 | A * | 4/1913 | Huber ....................... 24/135 N |
| 3,384,987 | A * | 5/1968 | Prechtl ........................ 40/757 |
| 5,669,593 | A * | 9/1997 | Kirchner ..................... 248/476 |
| 6,641,107 | B1 * | 11/2003 | Janssen ..................... 248/493 |
| 2003/0001053 | A1 | 1/2003 | Cho et al. | |
| 2004/0094685 | A1 * | 5/2004 | Janssen ..................... 248/489 |
| 2006/0027718 | A1 | 2/2006 | Quijano et al. | |

FOREIGN PATENT DOCUMENTS

| | | |
|---|---|---|
| GB | 102518 | 12/1916 |
| GB | 384616 | 12/1932 |
| KR | 20040085434 | 10/2004 |
| KR | 20050070839 | 7/2005 |
| WO | 2009/126458 | 10/2009 |

OTHER PUBLICATIONS

European Search Report issued Dec. 17, 2009 in EP Application No. 09159736.9.

* cited by examiner

*Primary Examiner*—Ramon O Ramirez
(74) *Attorney, Agent, or Firm*—Stanzione & Kim LLP

(57) ABSTRACT

A lifting device used to fix the display apparatus to a wall. The display apparatus can be formed in a rear surface thereof with a plurality of holes. The lifting device includes a wire having both ends coupled to any one pair of holes of the plurality of holes, and a wire hanger fixed to the wall and used to hang the wire on the wall.

20 Claims, 10 Drawing Sheets

LIFTING DEVICE OF A DISPLAY APPARATUS

CROSS-REFERENCE TO RELATED APPLICATIONS

This application claims priority under 35 U.S.C. §119(a) from Korean Patent Applications No. 2008-0043078, filed on May 8, 2008, No. 2008-0066779, filed on Jul. 10, 2008, No. 2009-0015819, filed on Feb. 25, 2009, and No. 2008-0120211, filed on Nov. 30, 2008 in the Korean Intellectual Property Office, the disclosures of which are incorporated herein in their entirety by reference.

BACKGROUND

1. Field of the Invention

The present general inventive concept relates to a lifting device of a display apparatus, and, more particularly, to a lifting device of a display apparatus capable of fixing the display apparatus to a wall by using a wire.

2. Description of the Related Art

A display apparatus is one type of screen output apparatus, such as televisions, computer monitors, etc., and is currently used in homes, offices, and the like. In recent years, a flat panel type display apparatus having a thin thickness and a small volume, such as a Liquid Crystal Display (LCD), Plasma Display Panel (PDP), etc., has been developed and has been widely used. Thus, a demand therefor is gradually increasing.

Such a flat panel type display apparatus having a thin thickness allows for more effective space utilization when being mounted to a wall, thus exhibiting convenience of use. For this reason, a variety of lifting devices which are used to mount a display apparatus to the wall have been developed.

As one example of a supporting device for a display apparatus, Korean Patent Laid-Open Publication No. 2005-0070839 discloses a wall-mounted device for a wall-mounted TV. The disclosed wall-mounted device functions to mount the flat wall-mounted TV to the wall in a simplified manner and also allows a viewer to adjust a viewing angle of the wall-mounted TV to a desired position.

The wall-mounted device for a wall-mounted TV disclosed in the 2005-0070839 Publication includes a back cover defining a rear surface of the wall-mounted TV, a wall-mounted wire to allow the wall-mounted TV to be hung and fixed to a wall, a wire fixing part integrally formed with a rear surface of the back cover to fix the wire, and an angle adjustor provided at the rear surface of the back cover which is used to adjust a viewing angle of the wall-mounted TV.

However, with relation to the angle adjustor included in the supporting device disclosed in the 2005-0070839 Publication, in order to adjust the viewing angle, a viewer must directly rotate upper and lower pivoting parts of the angle adjustor mounted to the back cover to adjust the viewing angle of the display apparatus. Thus, adjusting the viewing angle of the display apparatus is difficult and time consuming.

Further, when providing the back cover of the wall-mounted TV with the wire fixing part which is used to fix the wire, the wire fixing part has difficulty in firmly supporting a large-size wall-mounted TV and may be damaged by a weight of the TV thus causing an accident, such as releasing from the back cover and dropping the wall-mounted TV.

In addition, the wire fixing part provided at the back cover of the wall-mounted TV requires additional processing and undesirably increases a number of manufacturing processes required and manufacturing costs associated therewith.

In addition, the wire of the supporting device disclosed in the 2005-0070839 Publication is exposed to an area outside of the display apparatus, causing deterioration in an outer appearance.

SUMMARY

The present general inventive concept provides a lifting device of a display apparatus including a tilting unit to allow a user to easily adjust a viewing angle of the display apparatus.

The present general inventive concept also provides a lifting device of a display apparatus having a configuration capable of firmly mounting a wire to the display apparatus.

The present general inventive concept also provides a lifting device of a display apparatus capable of connecting a wire to the display apparatus without additional processing.

The present general inventive concept also provides a lifting device of a display apparatus capable of fixing the display apparatus substantially in parallel to a wall.

Additional features and/or utilities will be set forth in part in the description which follows and, in part, will be obvious from the description, or may be learned by practice of the general inventive concept.

Embodiments of the present general inventive concept can be achieved by providing a lifting device of a display apparatus to fix the display apparatus to a wall, the display apparatus having a plurality of holes formed in a rear surface thereof, the lifting device including a wire having both ends to be coupled to at least one pair of holes of the plurality of holes, and a wire hanger attachable to the wall to hang the wire on the wall.

The wire may be coupled to a pair of holes formed at an upper portion of the rear surface of the display apparatus.

The lifting device may further include spacing members fixed to a pair of lower holes formed at a lower portion of the rear surface of the display apparatus, the spacing members space the rear surface of the display apparatus from the wall by a distance.

The plurality of holes may be video electronics standards association (VESA) holes formed according to (VESA) wall mount standards.

The lifting device may further include rotating arms rotatably mounted to the spacing members to tilt the display apparatus.

Each of the spacing members may include a screw insertion hole to fasten a screw, a supporting portion to control rotation of the corresponding rotating arm, and a buffer member provided at an area which makes contact with the wall.

The rotating arms may be vertically rotatable to tilt the display apparatus when ends of the rotating arms are supported on the wall via a rotation of the rotating arms.

The wire may be longer than a horizontal distance between the pair of upper holes, but shorter than a sum of distances between each of the pair of upper holes and a point where a vertical line passing through a center between the pair of upper holes meets an upper end of the display apparatus.

The lifting device may further include fixing units coupled respectively to both the ends of the wire and to the plurality of holes.

The wire may be screwed to the fixing units.

Each of the fixing units may include a fixing member to be coupled with the wire, and a case to receive the fixing member.

Each of the fixing units may be provided with a wire insertion hole to guide the wire to an interior space of the fixing unit.

The fixing unit may include a first case defining an outer appearance, and a second case coupled with the first case to define an internal wire winding space.

The wire insertion hole may be provided at an outer periphery of the first case.

Each end of the wire may be provided with an anti-separation portion to prevent the wire from being separated from the fixing unit.

Each of the fixing units may be provided with a wire insertion hole to guide the wire to an interior space of the fixing unit, and the anti-separation portion may have a radius larger than a radius of the wire insertion hole.

The anti-separation portion of the wire may form a locking knot in an interior space of the fixing unit.

Each of the fixing units may include a buffer member provided at a region thereof in contact with the wall.

Embodiments of the present general inventive concept can also be achieved by providing a lifting device of a display apparatus to fix the display apparatus to a wall, the lifting device including a pair of fixing units to be coupled to a rear surface of the display apparatus, a wire having both ends to be coupled to the fixing units, and a wire hanger attachable to the wall and used to hang the wire on the wall.

The pair of fixing units may be detachably screwed to at least one pair of holes of the plurality of holes disposed at a rear surface of the display apparatus.

The at least one pair of holes may be indented in a forward direction away from the rear surface of the display apparatus.

The at least one pair of holes may be a pair of VESA holes formed according to Video Electronics Standards Association (VESA) wall mount standards.

Each of the fixing units may be provided with a wire insertion hole to guide the wire to an interior space of the fixing unit.

Each of the fixing units may include a first case to define an outer appearance, and a second case coupled with the first case to define an internal wire winding space.

The fixing unit may be provided with a wire insertion hole to guide the wire to the internal wire winding space of the fixing unit, and the wire insertion hole may be provided in an outer periphery of the first case.

Each end of the wire may be provided with an anti-separation portion to prevent the wire from being separated from the fixing unit.

Each of the fixing units may be provided with a wire insertion hole to guide the wire to an interior space of the fixing unit, and the anti-separation portion may have a radius larger than a radius of the wire insertion hole.

The anti-separation portion of the wire may form a locking knot in the interior space of the fixing unit.

Each of the fixing units may include a buffer member provided at a region thereof in contact with the wall.

The lifting device may further include spacing members coupled below the pair of fixing units to space the rear surface of the display apparatus from the wall by a distance.

A pair of upper holes and a pair of lower holes may be formed in the rear surface of the display apparatus, the fixing units being coupled to the pair of upper holes, and the spacing members being coupled to the lower holes.

The lifting device may further include rotating arms rotatably mounted to the spacing members to tilt the display apparatus.

The wire may be longer than a distance between an upper pair of VESA holes, but shorter than a sum of distances between each of the VESA holes and a point where a vertical line passing through a center between the pair of upper VESA holes meets an upper end of the display apparatus.

Embodiments of the present general inventive concept can also be achieved by providing a lifting device of a display apparatus to fix the display apparatus to a wall, the display apparatus being formed in a rear surface thereof with a plurality of VESA holes according to Video Electronics Standards Association (VESA) wall mount standards at a rear surface thereof, the lifting device including a wire having both ends to be coupled to any one pair of VESA holes of the plurality of VESA holes and a pair of fixing units to couple the wire to the VESA holes.

Embodiments of the present general inventive concept can also be achieved by providing a lifting device of a display apparatus to fix the display apparatus to a wall, the display apparatus being formed in a rear surface thereof with at least two holes at a rear surface thereof, the lifting device including a pair of fixing units to be coupled to any one pair of holes of the at least two holes and a wire having both ends to be coupled to the fixing units.

Embodiments of the present general inventive concept can also be achieved by a lifting device of a display apparatus having a plurality of holes thereon, the lifting device including a wall mount attachable to a fixed surface and a flexible member to be coupled to at least one pair of holes of the plurality of holes, wherein the display apparatus is supported when the flexible member is coupled to the wall mount.

The flexible member may include a wire.

The wire may be made of metal.

The at least one pair of holes may be disposed on opposite sides of an upper portion of the display apparatus.

The lifting device may further include at least spacing member to be coupled to another pair of holes of the plurality of holes to control a distance between the display apparatus and the fixed surface.

The lifting device may further include a tilting unit to be coupled to the fixed surface to tilt the display apparatus.

A rotation of the tilting unit may correspond to a tilt angle of the display apparatus.

The lifting device may further include a controller to control the tilt angle of the display apparatus based on a received signal.

BRIEF DESCRIPTION OF THE DRAWINGS

These and/or other features and utilities of the exemplary embodiments will become apparent and more readily appreciated from the following description of the exemplary embodiments, taken in conjunction with the accompanying drawings of which.

DETAILED DESCRIPTION OF THE EMBODIMENTS

Figure 1:
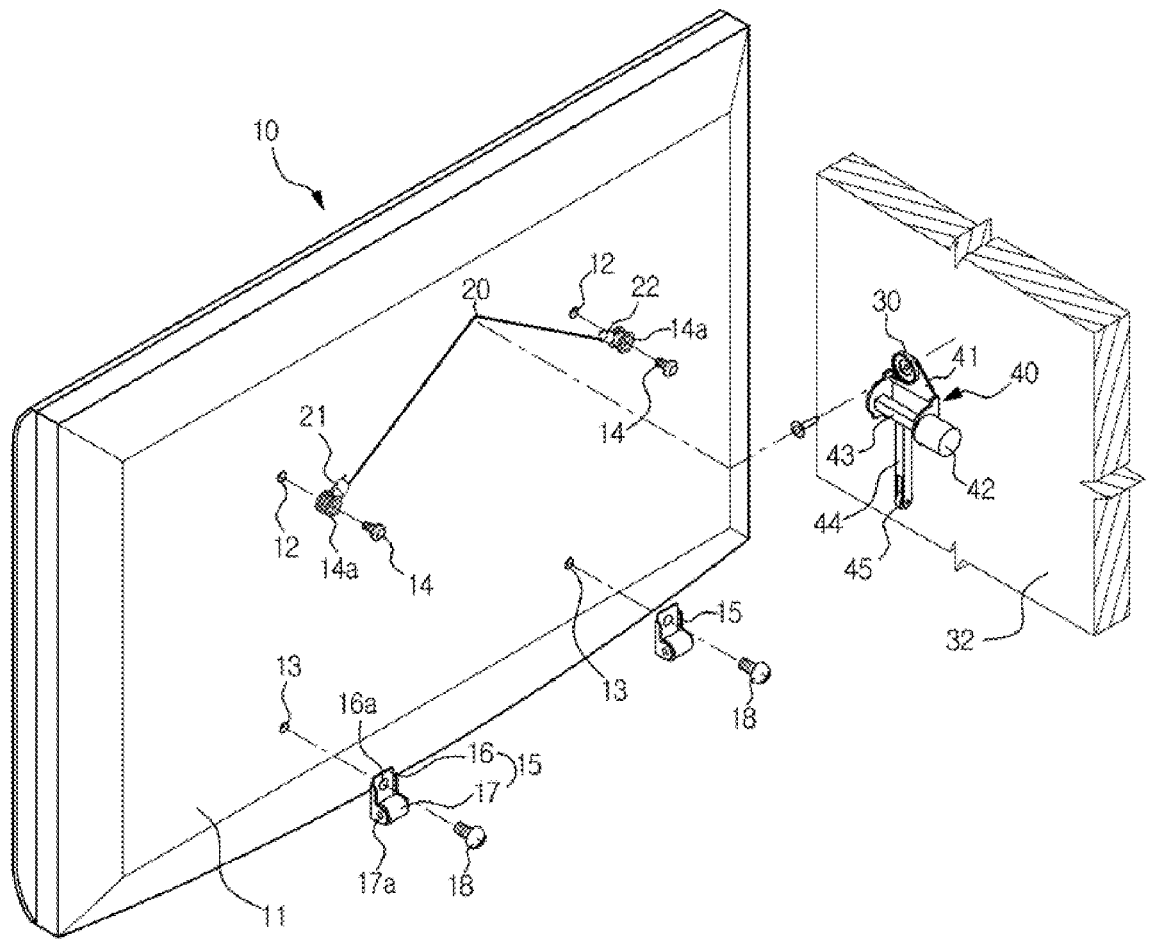
FIG. 1 is an exploded perspective view illustrating an overall outer appearance of a lifting device of a display apparatus according to an exemplary embodiment.

Reference will now be made in detail to exemplary embodiments of the present general inventive concept, examples of which are illustrated in the accompanying drawings, wherein like reference numerals refer to like elements throughout. The exemplary embodiments are described below to explain the present general inventive concept by referring to the figures.

Now, a lifting device of a display apparatus according to a first exemplary embodiment will be described with reference to the accompanying drawings.

Figure 2:
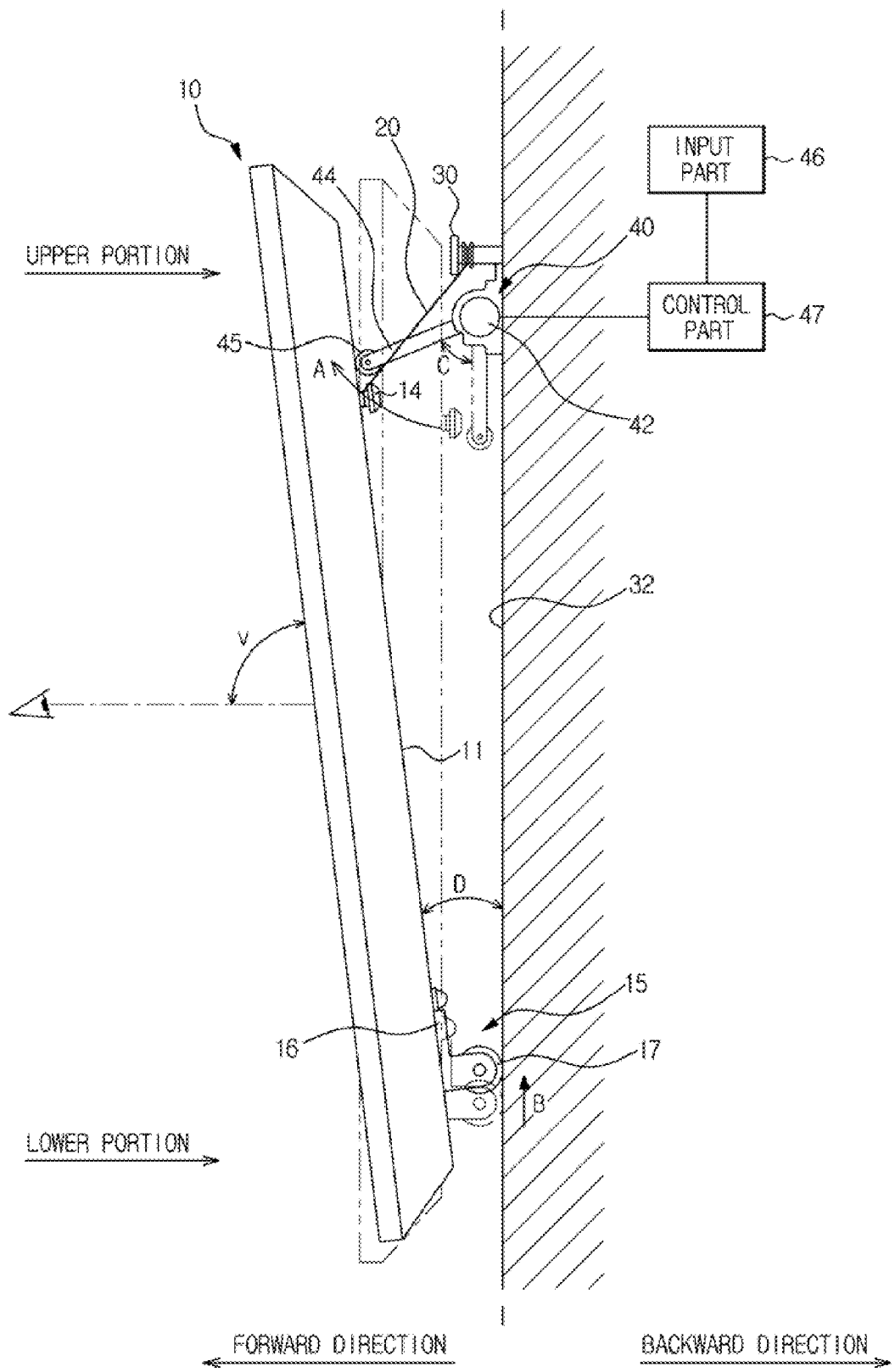
FIG. 2 is a side view illustrating an operation of the lifting device of the display apparatus according to the exemplary embodiment of FIG. 1.

FIG. 1 is an exploded perspective view illustrating an overall outer appearance of a lifting device of a display apparatus according to an exemplary embodiment, and FIG. 2 is a side view illustrating an operation of the lifting device of the display apparatus according to the exemplary embodiment of FIG. 1.

The lifting device of the display apparatus 10 according to an exemplary embodiment, as illustrated in FIGS. 1 and 2, includes a wire 20 to be coupled to a display apparatus 10, a wire hanger 30 to fix the wire 20 to a wall 32 so as to support a weight of the display apparatus 10, and a tilting unit 40 to adjust a viewing angle V of the display apparatus 10.

The wire 20 may be provided to connect the display apparatus 10 with the wire hanger 30. In exemplary embodiments, the wire 20 may be made of metal so as to withstand the weight of the display apparatus 10. However, the present general inventive concept is not limited thereto. That is, the wire 20 may be formed of any material capable of supporting a weight of the display apparatus 10. Both first and second ends 21 and 22 of the wire 20 may be coupled to opposite sides of a rear surface 11 of the display apparatus 10.

In exemplary embodiments, the rear surface 11 of the display apparatus 10 may be indented or formed with a plurality of holes 12 and 13 which may be substantially perpendicular to the rear surface 11 of the display apparatus 10. The plurality of holes 12 and 13 may include a pair of upper holes 12 arranged at opposite sides of an upper portion of the rear surface 11 to be coupled with the wire 20, and a pair of lower holes 13 arranged at opposite sides of a lower portion of the rear surface 11 to be coupled with spacing members 15, which will be described hereinafter.

In exemplary embodiments, each of the upper holes 12 may be fastened with an annular fixing piece 14a to which the wire 20 may be coupled, and a fastening screw 14 to fasten the fixing piece 14a to the rear surface 11 of the display apparatus 10.

Both first and second ends 21 and 22 of the wire 20 may be looped and fixed to an outer periphery of the fixing piece 14a. The fastening screw 14 penetrates through a center of the annular fixing piece 14a to thereby be screwed into the upper hole 12 thus serving to fix the fixing piece 14a to the rear surface 11 of the display apparatus 10. However, the present general inventive concept is not limited thereto. That is, in exemplary embodiments, the first and second ends 21 and 22 may further include an attachment member which may be coupled to the rear surface 11 of the display apparatus. The attachment member may include various attachment devices, such as loops or hooks to couple the wire 20 to the display apparatus 10.

With regard to the above-described configuration wherein the wire 20 is fixed to the upper holes 12 in the rear surface 11 of the display apparatus 10, the upper portion of the display apparatus 10 may be tilted forward when the wire 20 connected to the display apparatus 10 is hung on the wire hanger 30 on the wall 32.

In order to prevent the forward tilting of the display apparatus 10, the lifting device of the display apparatus 10 according to the exemplary embodiment of FIG. 1 includes the spacing members 15 coupled to the lower holes 13. The spacing members 15 allow the lower portion of the display apparatus 10 to be supported on the wall 32, while being spaced apart from the wall 32 by a predetermined distance.

In exemplary embodiments, as the lower portion of the display apparatus 10 is spaced apart from the wall 32 by the predetermined distance by the spacing members 15, the display apparatus 10 may maintain a constant distance from the wall 32 in a vertical direction and may prevent the display apparatus 10 from being tilted forward.

Each of the spacing members 15 includes a fastening bracket 16 which may be used to fasten the spacing member 15 to the rear surface 11 of the display apparatus 10, and a first wheel 17 rotatably coupled to the fastening bracket 16. The fastening bracket 16 has a screw hole 16a formed in an upper portion thereof, through which a screw 18 to fasten the spacing member 15 to the lower hole 13 may be inserted. The fastening bracket 16 may further include a wheel mount 17a formed in a lower portion thereof, to which the first wheel 17 may be rotatably coupled.

When the display apparatus 10 performs a tilting operation, as illustrated in FIG. 2, the upper portion of the display apparatus 10 where the upper holes 12 are located may be moved along an arc, as indicated by the arrow A, about the wire hanger 30. With this tilting operation, the upper portion of the display apparatus 10 may be pivotally rotated forward to have a specific inclination with respect to the wall 32, and the lower portion of the display apparatus 10 is moved upward along the wall 32 in a vertical direction, as indicated by the arrow B. That is, during the tilting operation, the upper portion of the display apparatus 10 may be inclined with respect to the wall 32 to thereby adjust the viewing angle V of the display apparatus 10. The viewing angle V refers to an angle between the display apparatus 10 and a line of sight of a viewer.

In the present exemplary embodiment, the first wheel 17 may be vertically movable while being supported on the wall 32 to allow for a smooth tilting operation of the display apparatus 10, without causing damage to the rear surface 11 of the display apparatus 10.

The upper and lower holes 12 and 13 may be so-called VESA holes processed at the rear surface 11 of the display apparatus 10 to comply with Video Electronics Standards Association (VESA) wall-mount standards. In exemplary embodiments, using the VESA holes without additional hole-processing of the display apparatus 10, the wire 20 and the first wheel 17 may be coupled to the display apparatus 10 in a simplified manner.

The tilting unit 40, included in the lifting device of the display apparatus 10 according to the first exemplary embodiment, includes a fixing bracket 41 to couple the tilting unit 40 to the wall 32, a drive motor 42 provided at the fixing bracket 41, an arm 44 having a first end 44a coupled to the drive motor 42 so as to rotate about a rotating shaft 43 of the drive motor 42, and a second wheel 45 provided at a second end 44b of the arm 44 to allow the arm 44 to smoothly move up and down on the rear surface 11 of the display apparatus 10.

Although the fixing bracket 41 may be mounted to the wall 32 independently of the wire hanger 30, the present exemplary embodiment provides that the wire hanger 30 may be integrally formed at an upper end of the fixing bracket 41 so as to fix the tilting unit 40 to the wall 32, when the wire hanger 30 is mounted to the wall 32.

In exemplary embodiments, the drive motor 42 may be provided with a gear (not illustrated) engaged with the rotating shaft 43.

In exemplary embodiments, the arm 44 may be a bar extending substantially perpendicular to the rotating shaft 43, and the second wheel 45 may be rotatably coupled to the second end 44b of the arm 44.

As the arm 44 may be pivotally rotated upward via an operation of the drive motor 42, the arm 44 presses against the upper portion of the rear surface 11 of the display apparatus 10 thereby causing the display apparatus 10 to tilt in the forward direction.

In this case, the drive motor 42 may be set to exhibit a predetermined stop torque equal to or greater than a force necessary to pull the display apparatus 10 toward the wall 32. Thereby, even if the operation of the drive motor 42 is stopped in a tilted state of the display apparatus 10, the drive motor 42 functions as a rotation obstructer to prevent or substantially reduce a rotation of the arm 44 in order to maintain the tilted state of the display apparatus 10. That is, in exemplary embodiments, the drive motor 42 may prevent the display apparatus 10 from tilting further in the forward direction when the operation of the drive motor 42 has stopped.

In exemplary embodiments, the tilting unit 40 may further include an input part 46 to provide operating signals for the drive motor 42, and a control part 47 to control the drive motor 42 based on the operating signals received from the input part 46 (see FIG. 2).

The input part 46 may be provided in the display apparatus 10 or in a remote controller (not illustrated). The input part 46 may rotate the arm 44 by a preset rotation angle C, or may apply on/off signals of the drive motor 42 to the control part 47.

The control part 47 operates the drive motor 42 based on the operating signals received from the input part 46, to thereby adjust the rotation angle C of the arm 44.

In an exemplary embodiment, if a user selects a tilting mode, the control part 47 may rotate the arm 44 by the rotation angle C which may correspond to a predetermined tilting angle D which is recorded in the control part 47. In other words, the tilting mode may be classified, for example, into upper, medium, and lower levels based on the titling angle D. If the user selects any one of the upper, medium, and lower levels, the control part 47 rotates the arm 44 by a particular rotation angle C corresponding to the predetermined tilting angle D of the selected upper, medium, or lower level. In particular, each of the upper, medium, and lower levels corresponds to a particular tilting angle D which may be stored within the control part 47. However, the present general inventive concept is not limited thereto. That is, in exemplary embodiments, the rotation angle C of the arm 44 may be adjusted to achieve any desired viewing angle V of the display apparatus 10.

Also, as the drive motor 42 is operated to rotate the arm 44 in proportion to a time required to apply the operating signals to the drive motor 42 via the input part 46, the display apparatus 10 may be tilted to a desired tilting angle selected by the user.

In the lifting device of the display apparatus 10 according to the exemplary embodiment of FIG. 1 as described above, the wire 20 may be connected to the upper holes 12 in the rear surface 11 of the display apparatus 10 by using the annular fixing pieces 14a and the fastening screws 14, and the spacing members 15 may be coupled to the lower holes 13. In addition, in exemplary embodiments, the tilting unit 40 which may be integrally formed with the wire hanger 30 may be fixedly screwed to the wall 32, thereby completing the assembly of the lifting device of the display apparatus 10.

Thereafter, if the wire 20 coupled to the display apparatus 10 is hung on the wire hanger 30, which is fixed to the wall 32, installation of the display apparatus 10 would thereby be complete.

The above-described lifting device of the display apparatus 10 according to the present exemplary embodiment has the effect of improving space utilization due to a minimized distance between the display apparatus 10 and the wall 32 and also allows a user to easily adjust a viewing angle V of the display apparatus 10 by operating the tilting unit 40 by using a remote controller, etc.

Figure 3:
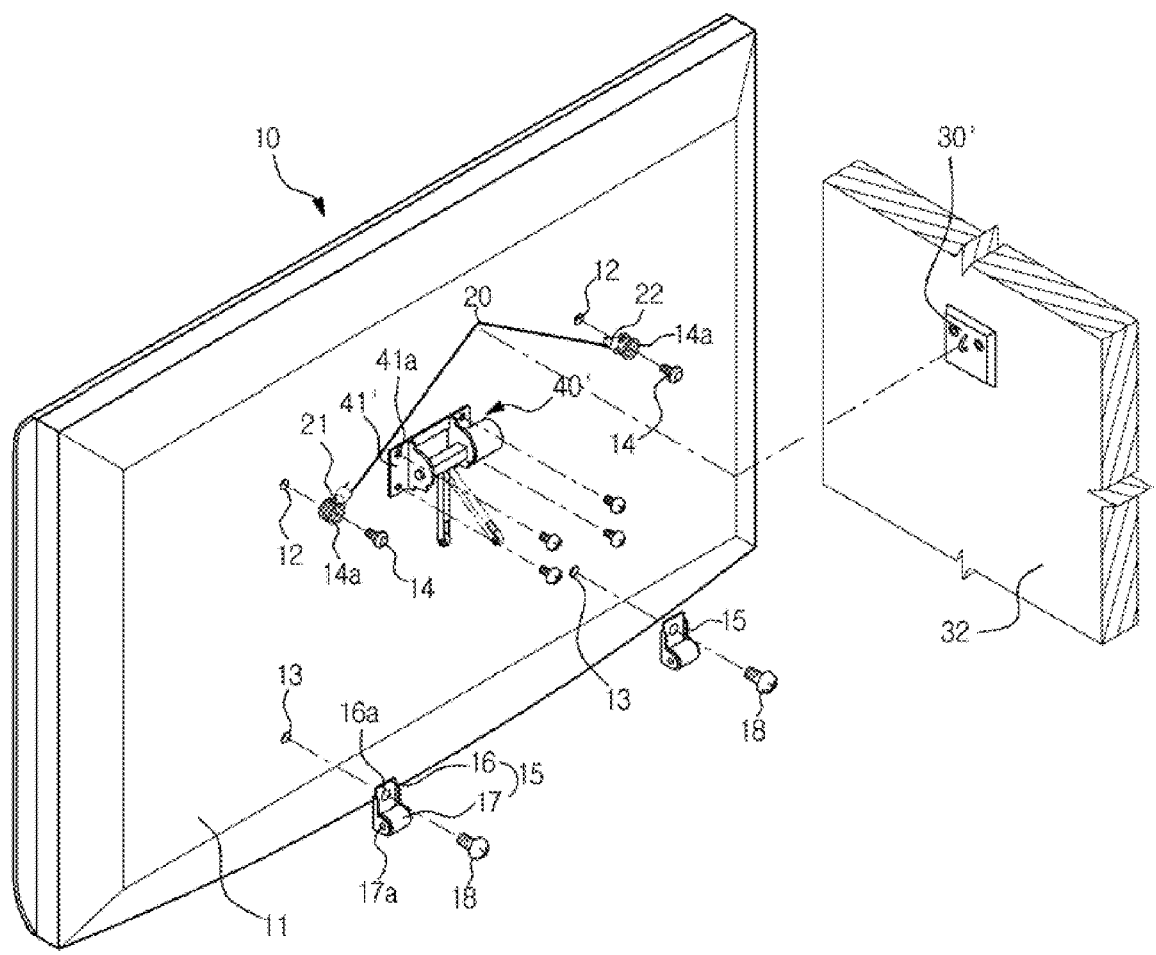
FIG. 3 is an exploded perspective view illustrating a lifting device of a display apparatus according to another exemplary embodiment.

FIG. 3 is an exploded perspective view illustrating a lifting device of a display apparatus 10 according to another exemplary embodiment.

The lifting device of the display apparatus 10 according to another exemplary embodiment has substantially the same configuration as the above-described exemplary embodiment of FIG. 1, except that an installation position of the tilting unit 40 is changed.

Of the elements of the present exemplary embodiment, the same elements as those of the exemplary embodiment of FIG. 1 are designated by the same reference numerals, and therefore a description thereof will be omitted.

Although the exemplary embodiment of FIG. 1 describes the tilting unit 40 integrally formed with the wire hanger 30, in the present exemplary embodiment, a wire hanger 30' and a tilting unit 40' are provided as individual elements which may be separate from each other.

Specifically, although the wire hanger 30' may be coupled to or fixed to the wall 32 and the tilting unit 40' may be coupled to or fixed to any one of the wall 32 or the rear surface of the display apparatus 10, the present exemplary embodiment describes, for example, that the tilting unit 40' may be coupled to or fixed to the rear surface 11 of the display apparatus 10.

The tilting unit 40' has substantially similar or the same configuration as the first exemplary embodiment, except that a fixing bracket 41' may be formed with a screw hole 41a to fasten the tilting unit 40' to the rear surface 11 of the display apparatus 10. However, the present general inventive concept is not limited thereto. That is, in exemplary embodiments, the tilting unit 40' may be coupled to various other portions of the display apparatus 10 by various other attachment devices.

Accordingly, the tilting unit 40' may be coupled to the wall 32 or to the rear surface of the display apparatus 10, and may exhibit the same effect as the first exemplary embodiment.

Next, a lifting device of a display apparatus 10 according to another exemplary embodiment will be described.

Figure 4:
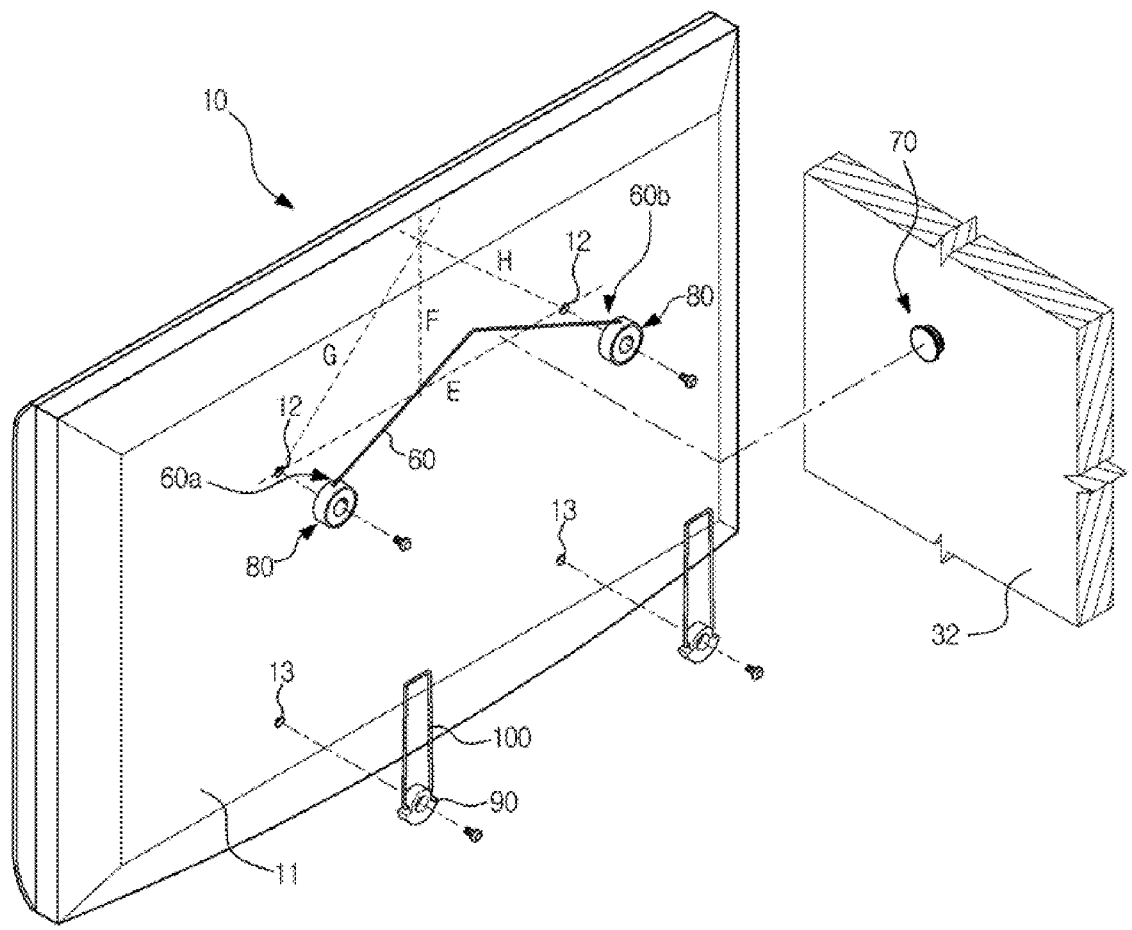
FIG. 4 is an exploded perspective view illustrating an overall outer appearance of a lifting device of a display apparatus according to another exemplary embodiment.
Figure 5:
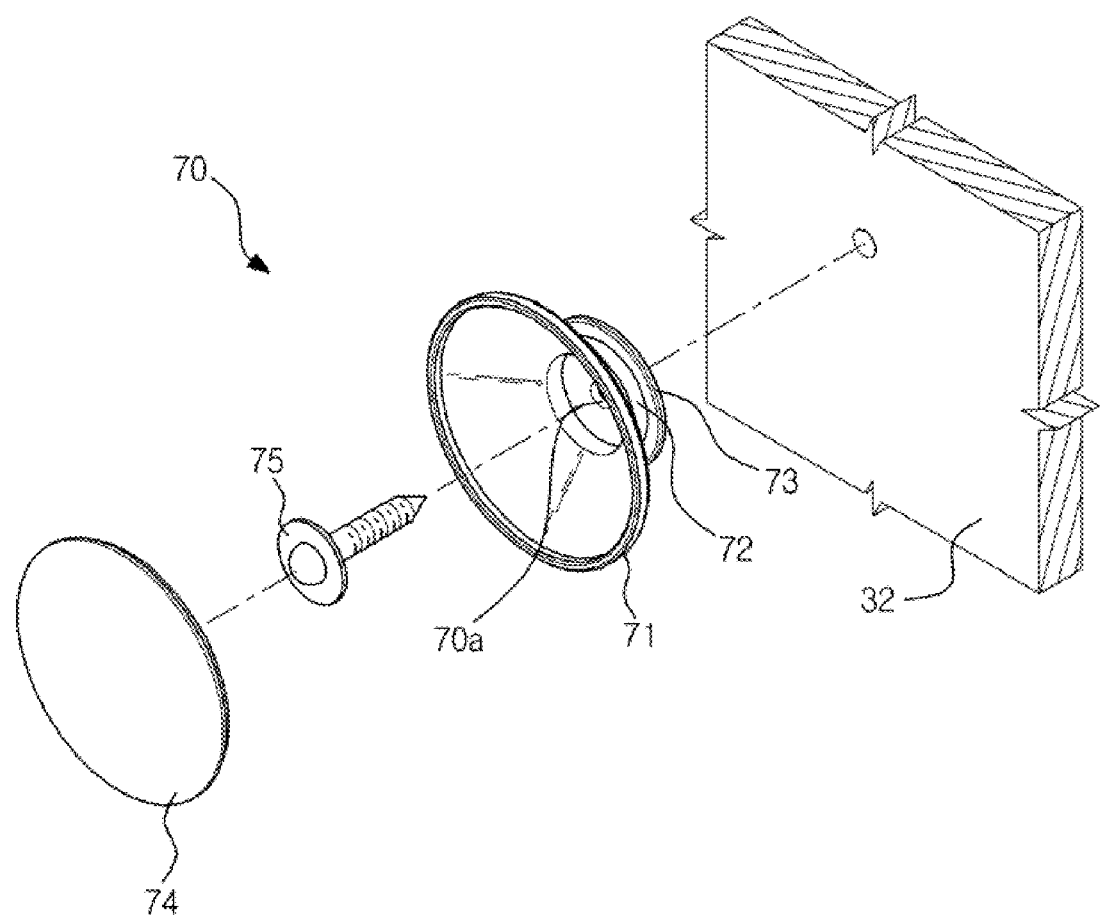
FIG. 5 is an exploded perspective view illustrating elements of a wire hanger included in the lifting device of the display apparatus according to the exemplary embodiment of FIG. 4.
Figure 6:
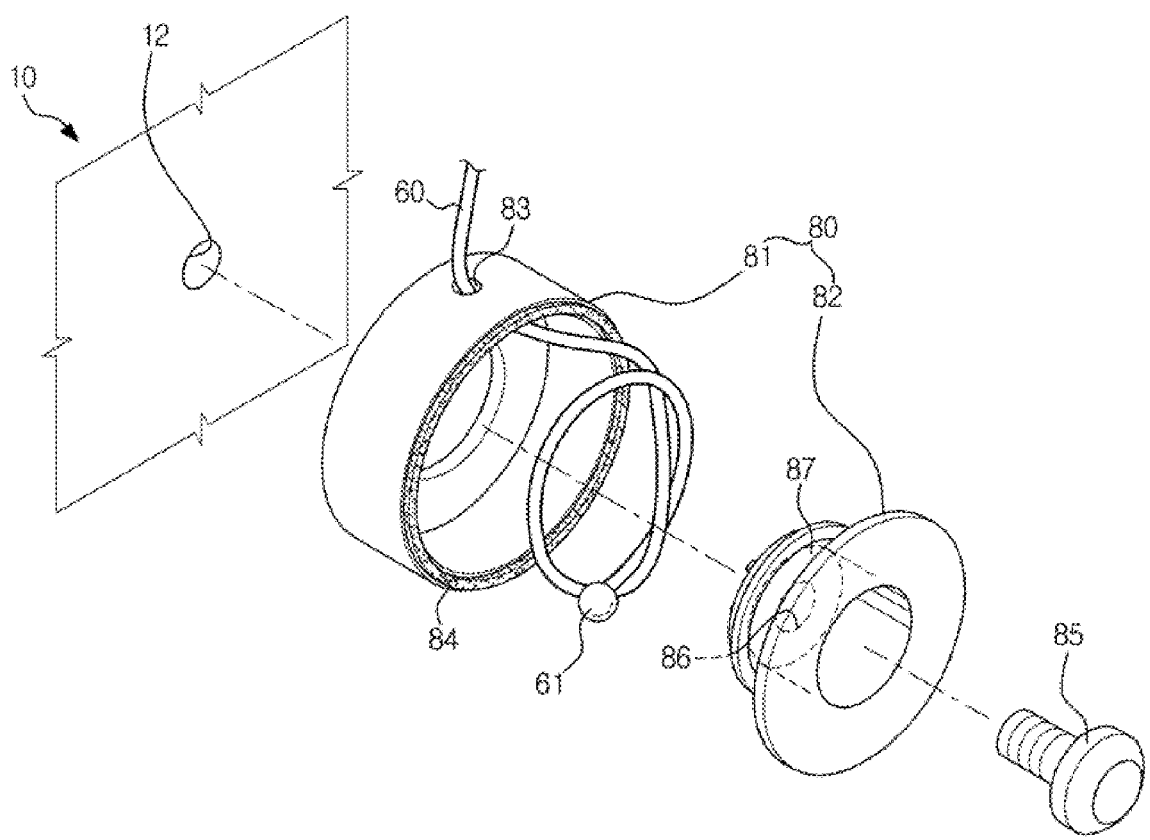
FIG. 6 is an exploded perspective view illustrating an assembly relationship of elements of a fixing unit included in the lifting device of the display apparatus according to the exemplary embodiment of FIG. 4.
Figure 7:
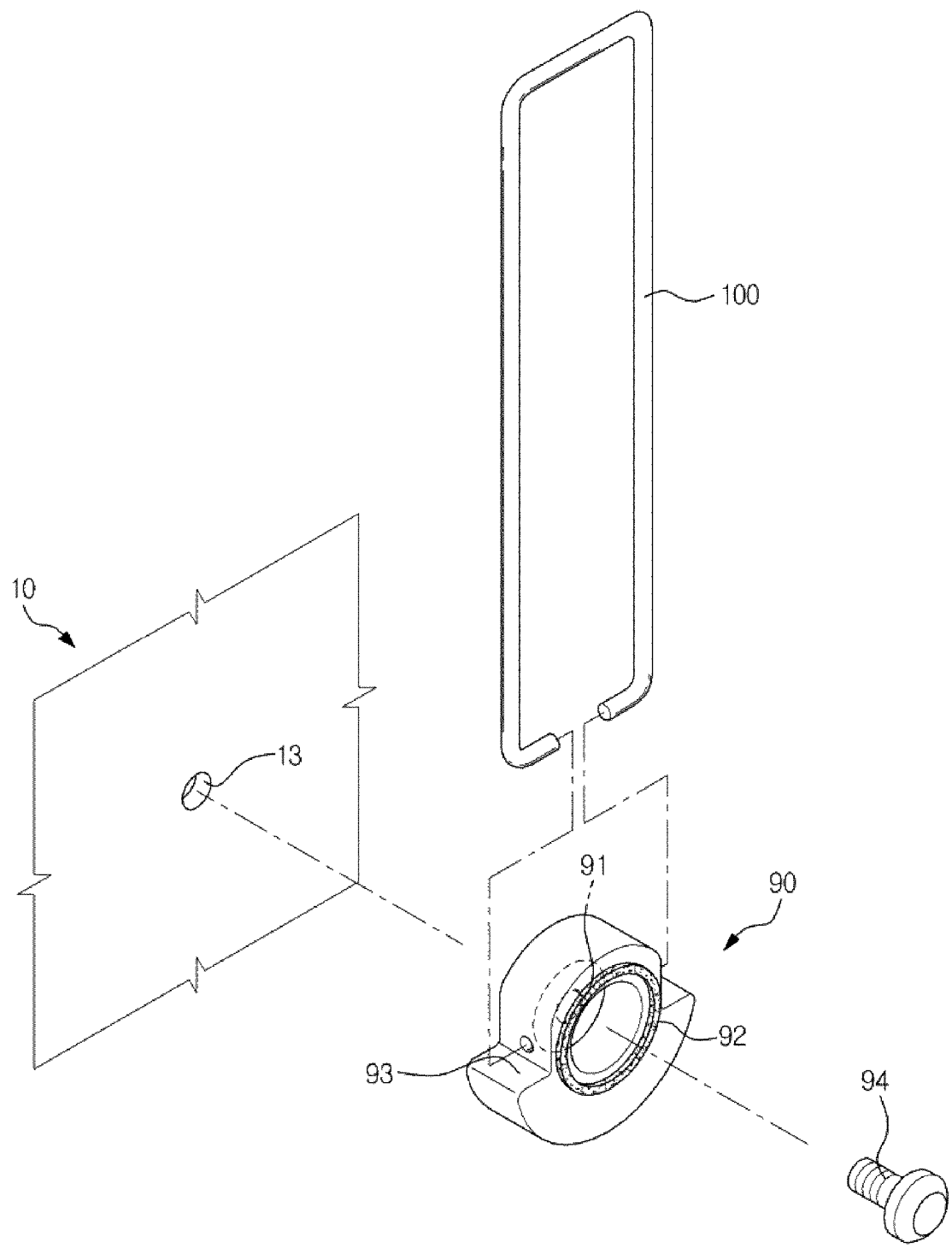
FIG. 7 is an exploded perspective view illustrating an assembly relationship of a spacing member and a rotating arm included in the lifting device of the display apparatus according to the exemplary embodiment of FIG. 4.

FIG. 4 is an exploded perspective view illustrating an overall outer appearance of a lifting device of a display apparatus 10 according to another exemplary embodiment, FIG. 5 is an exploded perspective view illustrating elements of a wire hanger included in the lifting device of the display apparatus according to the exemplary embodiment of FIG. 4, FIG. 6 is an exploded perspective view illustrating an assembly relationship of elements of a fixing unit included in the lifting device of the display apparatus 10 according to the exemplary embodiment of FIG. 4, and FIG. 7 is an exploded perspective view illustrating an assembly relationship of a spacing member and a rotating arm included in the lifting device of the display apparatus according to the exemplary embodiment of FIG. 4.

Figure 8:
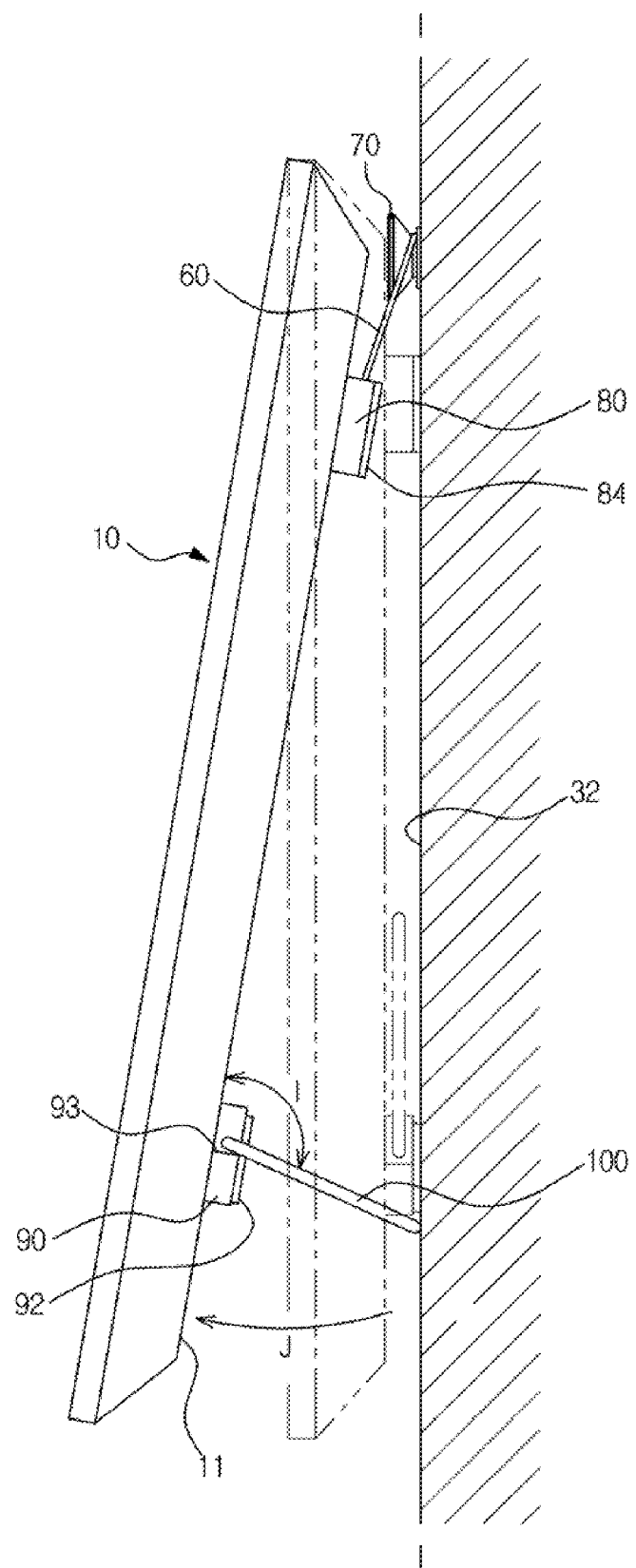
FIG. 8 is a side view illustrating an operation of the lifting device of the display apparatus according to the exemplary embodiment of FIG. 4.

Also, FIG. 8 is a side view illustrating an operation of the lifting device of the display apparatus according to the exemplary embodiment of FIG. 4.

As illustrated in FIG. 4, the lifting device of the display apparatus 10 according to an exemplary embodiment includes a wire 60 having a first and second end coupled to a rear surface 11 of the display apparatus 10, and a wire hanger 70 to fix the wire 60 to the wall 32 so as to support a weight of the display apparatus 10. However, the present general inventive concept is not limited thereto. That is, in exemplary embodiments, the wire 60 may also be in the form of a rod or a bar.

The lifting device of the display apparatus 10 according to the present exemplary embodiment further includes fixing units 80 to couple the wire 60 to the rear surface 11 of the display apparatus 10 and may also space the rear surface 11 of the display apparatus 10 from the wall 32, and spacing members 90 mounted to the rear surface 11 of the display apparatus 10 at a position below the fixing units 80. In exemplary embodiments, spacing members 90 keep the rear surface 11 of the display apparatus 10 substantially parallel to the wall 32.

The wire hanger 70, as illustrated in FIG. 5, includes a head 71, a seating portion 72 which extends in a rearward direction from the head 71 on which a selected portion of the wire 60 is seated, and a wall supporting portion 73 which extends in a rearward direction from the seating portion 72 so as to come into contact with the wall 32.

In exemplary embodiments, the wire hanger 70 may be centrally formed with a screw hole 70a to fasten the wire hanger 70 to the wall 32. As a screw 75 is inserted through the screw hole 70a to thereby be coupled to or mounted into the wall 32, the wire hanger 70 may be coupled to or fixed to the wall 32.

In exemplary embodiments, a cap 74 may be fitted to the head 71 to prevent the screw 75 from being exposed to an external environment.

In exemplary embodiments, the seating portion 72 includes a radius smaller than or equal to radii of the head 71 and the wall supporting portion 73 may prevent or reduce a likelihood of the wire 60, which is caught by the seating portion 72, from being separated from the wire hanger 70.

The wire 60 may be provided to couple or connect the display apparatus 10 with the wire hanger 70. In exemplary embodiments, the wire 60 may be made of metal so as to withstand the weight of the display apparatus 10, and may be formed by twisting a plurality of metal threads and covering the twisted threads. However, the present general inventive concept is not limited thereto. That is, in alternative exemplary embodiments, the wire 60 may be formed of any material capable of supporting a weight of the display apparatus 10.

As illustrated in FIG. 4, both first and second ends 60a and 60b of the wire 60 may be coupled to opposite sides of the rear surface 11 of the display apparatus 10.

The rear surface 11 of the display apparatus 10 may be indented or formed with the plurality of holes 12 and 13 which are substantially perpendicular to the rear surface 11 of the display apparatus 10. The plurality of holes 12 and 13 include the pair of upper holes 12 arranged at opposite sides of an upper portion of the rear surface 11 to be coupled with the wire 60, and a pair of lower holes 13 arranged at opposite sides of a lower portion of the rear surface 11 to be coupled with spacing members 90.

The upper holes 12 are arranged at positions at approximately opposite sides of the upper portion of the rear surface 11 of the display apparatus 10.

In exemplary embodiments, the wire 60 may be longer than a distance E between the pair of upper holes 12, but shorter than a sum of distances E and G between each of the upper holes 12 and a point where a vertical line F passing a center between the pair of upper holes 12 meets an upper end of the display apparatus 10. This may prevent or substantially reduce the wire 60 from being visible at the outside of the display apparatus 10 mounted to the wall, assuring an aesthetic outer appearance of the display apparatus 10.

In exemplary embodiments, the above-described length of the wire 60 is measured excluding knots formed by anti-separation portions 61 which will be described hereinafter. Accordingly, it is noted that an actual length of the wire 60 may be determined by adding a length of the knots formed by the anti-separation portions 61 to the above-described length of wire 60.

The fixing units 80 may be screwed to the respective upper holes 12 after being coupled with both the ends 60a and 60b of the wire 60.

Each of the fixing units 80, as illustrated in FIG. 6, may include a first case 81 defining an outer appearance, and a second case 82 coupled with the first case 81 to define an interior space to wind an end of the wire 60.

The first case 81 may be formed with a wire insertion hole 83 in an outer periphery thereof through which an end of the wire 60 may be guided into the fixing unit 80. Also, a first buffer member 84 may be provided at an end portion, such as on the rim, of the first case 81 to prevent or substantially reduce damage and/or noise caused upon collision with the wall 32.

The wire 60 may be provided at ends 60a and 60b thereof with the anti-separation portion 61 to correspond to the wire insertion hole 83. That is, an end 60a or 60b of the wire 60 may be inserted into the interior space of the first case 81 via the insertion hole 83 and then may be coupled to an anti-separation portion 61 to prevent the wire 60 from being separated from the first case 81. The anti-separation portion 61 may be provided to prevent the wire 60 from being separated from the fixing unit 80 and for this, the anti-separation portion 61 has a radius larger than a radius of the wire insertion hole 83. However, the present general inventive concept is not limited thereto. That is, in alternative exemplary embodiments, the wire insertion hole 83 and the anti-separation portion 81 may be formed in various sizes and shapes, wherein a dimension of the anti-separation portion 81 may be larger than a dimension of the insertion hole 83.

The anti-separation portion 61 may be formed at the end of the wire 60 via a double injection molding process, etc., into a ball having a diameter larger than a thickness of the wire 60. However, the present general inventive concept is not limited thereto. That is, in exemplary embodiments, the anti-separation portion 61 may be integrally formed with at least one end of the wire 60.

After both the ends 60a and 60b of the wire 60 are inserted through the wire insertion holes 83 formed in the first cases 81 of the pair of fixing units 80, the anti-separation portions 61 may then be formed at the respective ends of the wire 60 via a double injection molding process, etc., to thereby prevent the wire 60 from being separated from the fixing units 80.

The second case 82 may be centrally formed with a screw hole 86 through which a fastening screw 85 may be inserted. Also, the second case 82 may be provided at an outer periphery thereof with a cylindrical portion 87. In a state wherein the second case 82 is coupled with the first case 81, the end of the wire 60 is wound on the cylindrical portion 87.

The second case 82 may be integrally formed with the coupling screw. In this case, the fixing unit 80 may be directly screwed into the upper hole 12 of the display apparatus 10.

The end of the wire 60 may be maintained in a wound state in a space defined by the first case 81 and the second case 82. As illustrated in FIG. 6, the end of the wire 60 is first wound onto the cylindrical portion 87 and then, the anti-separation portion 61 is tied to form a knot.

With the knot formed by the anti-separation portion 61, even if a large load is applied to the wire 60 when the display apparatus 10 is mounted to the wall 32, thus causing the wire 60 to be pulled with a first force, i.e., a pulling force, the knot of the anti-separation portion 61 may securely hold the wire 61 caught by the fixing unit 80, to thereby allow the wire 61 to withstand the large load. That is, the anti-separation portion 61 is coupled to the fixing unit 80 to be able to support a weight of the display apparatus 10.

The spacing members 90 are coupled to the lower holes 13 to maintain a predetermined distance between the rear surface 11 of the display apparatus 10 and the wall 32, so as to allow the display device 10 to be installed substantially parallel to the wall 32.

As illustrated in FIG. 7, each of the spacing members 90 may be centrally formed with a screw insertion hole 91. A rear surface of the spacing member 90 which faces or is in contact with the wall 32 may be provided with a second buffer member 92 to dampen a shock caused when the display apparatus 10 comes into contact with the wall 32.

The spacing member 90 may include a thickness sufficient to allow the lower portion of the display apparatus 10 to be spaced apart from the wall 32 by a predetermined distance, so as to keep the display apparatus 10 substantially parallel to the wall 32. However, the present general inventive concept is not limited thereto. That is, in alternative exemplary embodiments, the spacing members 90 may be provided with a screw such that a distance between the display apparatus 10 and the wall 32 may be adjusted.

The thickness of the spacing member 90 may be substantially equal to a thickness of the fixing unit 80, so as to keep the display apparatus 10 substantially parallel to the wall 32 as illustrated in FIG. 8.

The first and second buffer members 84 and 92 are supported respectively by the wall 32 and serve to prevent damage to the display apparatus 10. The first and second buffer members 84 and 92, for example, may be made of rubber and/or various other materials which function to absorb shock.

A rotating arm 100 which may be used to tilt the display apparatus 10 may be rotatably mounted to the spacing member 90.

Although in alternative exemplary embodiments the rotating arm 100 may be mounted in a vertically rotatable manner or in a horizontally rotatable manner, the present exemplary embodiment deals with a vertically rotatably mounted rotating arm 100, by way of example.

The spacing member 90 may include a supporting portion 93 to prevent or substantially reduce excessive rotation of the rotating arm 100.

Accordingly, if the user moves the lower portion of the display apparatus 10 in a forward direction away from the wall 32 in a state wherein the rotating arm 100 is arranged adjacent to the rear surface 11 of the display apparatus 10, the rotating arm 100 is rotated in a downward direction until the rotating arm 100 comes into contact with the supporting portion 93. In such a state, if the external force applied by the user is removed, as illustrated in FIG. 8, a free end of the rotating arm 100 is supported on the wall 32, whereby the lower portion of the display apparatus 10 is kept in a forwardly tilted state.

In a state wherein the lower portion of the display apparatus 10 is tilted as described above, the user is able to easily access terminals (not illustrated) arranged at the lower portion of the rear surface 11 of the display apparatus 10.

In this case, to prevent the rotating arm 100 from being pressed and unintentionally rotated upward by the weight of the display apparatus 10, an angle between the rear surface 11 of the display apparatus 10 and the rotating arm 100 may be greater than 90 degrees.

Although the upper and lower holes 12 and 13, to which the fixing units 80 and spacing members 90 are fixed, may be indented at certain positions in the rear surface 11 of the display apparatus 10 substantially perpendicular to the rear surface 11, the upper and lower holes 12 and 13 may be so-called VESA holes processed in the rear surface 11 of the display apparatus 10 to comply with Video Electronics Standards Association (VESA) wall-mount standards. Using the VESA holes without additional hole-processing of the display apparatus 10, the fixing units 90 coupled to or connected with the wire 60 and the spacing members 90 may be coupled to the display apparatus 10 in a simplified manner.

Figure 9:
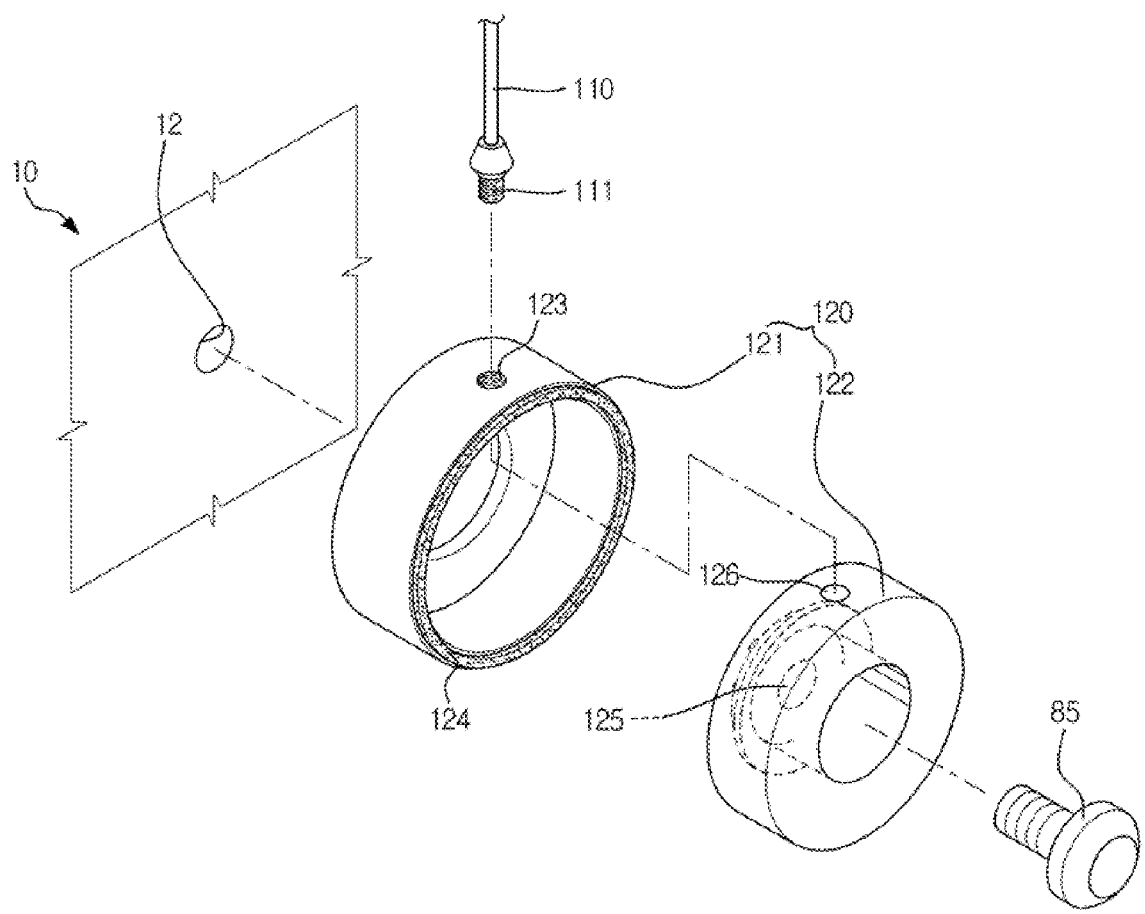
FIG. 9 is an exploded perspective view illustrating an assembly relationship of elements of a fixing unit included in a lifting device of a display apparatus according to another exemplary embodiment.

FIG. 9 is an exploded perspective view illustrating an assembly relationship of elements of a fixing unit included in a lifting device of a display apparatus according to another exemplary embodiment.

The present exemplary embodiment has substantially the same configuration as the previous exemplary embodiments, except for the configuration of the fixing unit.

In the following description, the same elements as those of the previous exemplary embodiments are designated by the same reference numerals, and therefore a description thereof will be omitted.

A fixing unit 120, as illustrated in FIG. 9, includes a first case 121 which defines an outer appearance and may be used for fixation of a wire 110, and a second case 122 coupled with the first case 121 to close a front side of the first case 121.

The first case 121 may be formed with a wire insertion hole 123 in an outer periphery thereof through which an end of the wire 110 is guided into the fixing unit 120. Also, a first buffer member 124 may be provided at a rear end the first case 121, such as on the rim, to prevent damage and/or noise caused upon collision with the wall 32.

The wire insertion hole 123 may be formed with a female screw, and the wire 110 may be provided with an anti-separation portion 111 at an end thereof to correspond with the wire insertion hole 123. Accordingly, as the anti-separation portion 111 is fastened with the wire insertion hole 123, the wire 110 may be firmly fixed to the fixing unit 120.

The anti-separation portion 111 takes the form of a male screw which corresponds to the wire insertion hole 123. The anti-separation portion 111 may be formed at the end of the wire 110 via die casting, etc, and may have a diameter larger than a thickness of the wire 110.

Accordingly, as the wire 110 is screwed into the wire insertion holes 123 provided in the first cases 121 of the pair of fixing units 120, the wire 110 may be firmly fixed to the fixing units 120.

The second case 122 may be centrally formed with a screw hole 125, through which the fastening screw 85 is able to be inserted. Also, the second case 122 may be provided with a receiving hole 126 in an outer periphery thereof to receive an end of the anti-separation portion 111.

With the strong screw fastening between the wire 110 and the fixing units 120, even if a large load is applied to the wire 110 when the display apparatus 10 is mounted to the wall 32 thereby causing the wire 110 to be pulled with an excessive pulling force, the wire 110 can withstand the large load.

Figure 10:
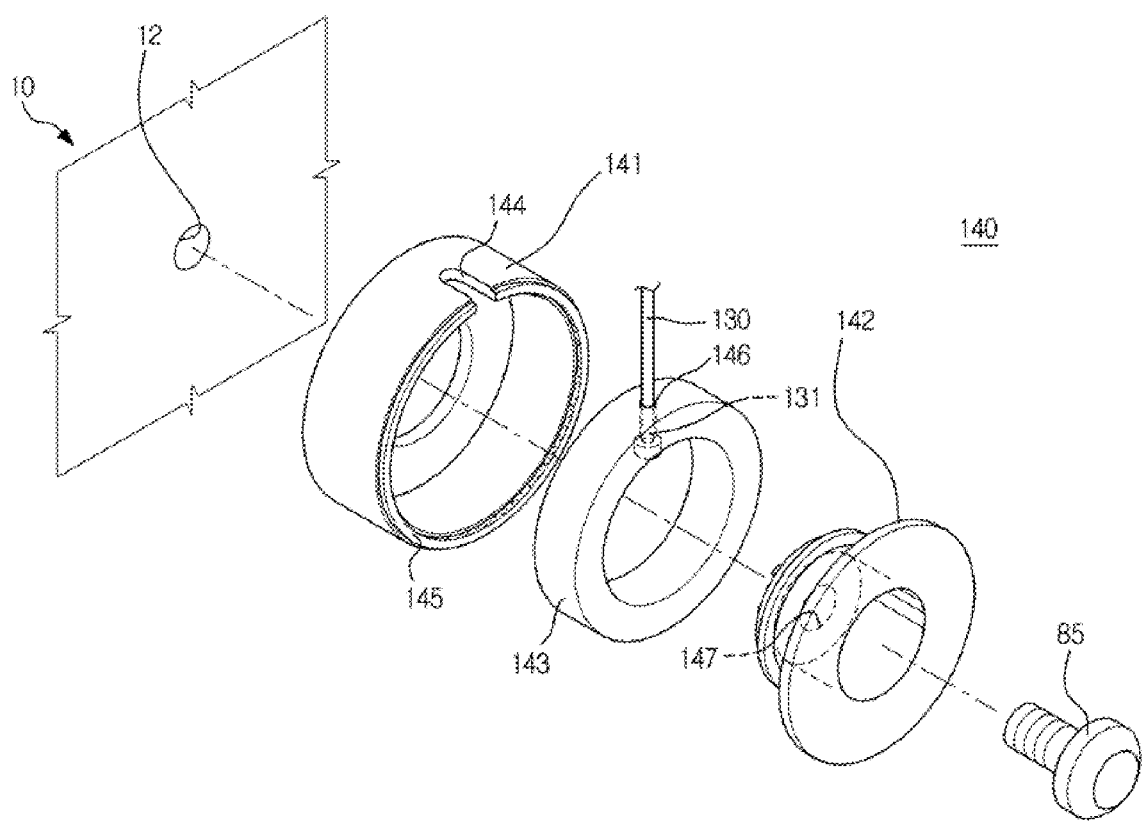
FIG. 10 is an exploded perspective view illustrating an assembly relationship of elements of a fixing unit included in a lifting device of a display apparatus according to another exemplary embodiment.

FIG. 10 is an exploded perspective view illustrating an assembly relationship of elements of a fixing unit included in a lifting device of a display apparatus according to another exemplary embodiment.

The present exemplary embodiment has substantially the same configuration as the previous exemplary embodiments, except for the configuration of the fixing unit.

In the following description, the same elements as those of the previous exemplary embodiments embodiment are designated by the same reference numerals, and therefore a description thereof will be omitted.

A fixing unit 140, as illustrated in FIG. 10, includes a first case 141 which defines an outer appearance and may be used for fixation of a wire 130, a second case 142 coupled with the first case 141 to close a front side of the first case 141, and a fixing member 143 coupled with the wire 130 and inserted in a space defined by the first and second cases 141 and 142.

The first case 141 is provided with a wire insertion hole 144 in an outer periphery thereof by cutting, such that the wire 130 is received in the wire insertion hole 144. Also, a first buffer member 145 may be provided at a rear end of the first case 141, such as on the rim, to prevent damage and/or noise caused upon collision with the wall 32.

The wire insertion hole 144 may be cut from a rear end of the first case 141 for insertion of the wire 130.

An end of the wire 130 may be fixed to the fixing member 143. The fixing member 143 may be an annular metal member provided in an outer periphery thereof with a wire hole 146 through which an end of the wire 130 is inserted.

After the wire 130 is inserted through the wire hole 146 from the outer periphery toward the inner periphery of the fixing member 143, an anti-separation portion 131 may be formed at the end of the wire 130 to prevent the wire 130 from being separated from the fixing member 143.

The anti-separation portion 131 may be formed at the end of the metallic wire 130 via die casting, etc, and may have a diameter larger than a diameter of the wire hole 146.

The second case 142 may be centrally formed with a screw hole 147, through which the fastening screw 85 is able to be inserted.

With the above-described configuration, first, the fixing member 143 which is coupled with the wire 130 is seated in the first case 141 such that an appropriate portion of the wire 130 is inserted into the wire insertion hole 144 of the first case 141. Thereafter, as the second case 142 is coupled with the first case 141 and the fastening screw 85 is screwed through the second case 142, the fixing unit 140 is thereby coupled to the rear surface 11 of the display apparatus 10.

The anti-separation portion 131 may be firmly formed at an end of the wire 130 and can prevent the wire 130 from being separated from the fixing member 143 even when a large load is applied to the wire 130. Also, since the fixing member 143 is fixed to the rear surface 11 of the display apparatus 10 by means of the fastening screw 85 while being received in the space defined by the first and second cases 141 and 142, there is no risk of the fixing member 143 being separated from the first and second cases 141 and 142, despite the large load applied to the wire 130.

The above-described exemplary embodiments describe configurations to firmly fix the wire 130 to the rear surface 11 of the display apparatus 10. Of course, it will be appreciated that other various configurations which may be used to firmly fix the wire 130 to the rear surface 11 of the display apparatus 10 may also be possible.

The lifting device of the display apparatus firmly fixes the wire using the holes indented in the rear surface of the display apparatus. This allows the display apparatus to be fixed to the wall by use of the wire, thereby achieving a minimized distance between the display apparatus and the wall and enhancement in space utility.

Further, the anti-separation portion provided at the end of the wire can assure sufficient safety under the influence of a large load.

Furthermore, coupling the spacing members, having a thickness corresponding to that of the fixing units, to the lower holes allows the display apparatus to maintain a constant distance from the wall in a vertical direction, preventing unwanted forward tilting of the display apparatus. In addition, the rotating arms are able to be coupled to the spacing members, allowing a user to easily access terminals, etc. provided at the rear surface of the display apparatus.

As apparent from the above description, the exemplary embodiments provide several utilities, some of which are described below.

In exemplary embodiments, within a lifting device of the display apparatus according to the present general inventive concept, a wire can be firmly fixed by using holes indented in a rear surface of the display apparatus. Fixing the display apparatus to the wall using the wire can minimize a distance between the display apparatus and the wall, thereby resulting in enhanced space utilization.

In alternative exemplary embodiments, an anti-separation portion may be formed at an end of the wire and may be tied to form a knot before the wire is mounted to a fixing unit. Accordingly, the anti-separation portion keeps the wire caught by the fixing unit and provides stability even under an influence of a large load.

As spacing members which have a thickness corresponding to that of fixing units are coupled to lower holes formed in the rear surface of the display apparatus, the display apparatus can maintain a constant distance from the wall in a vertical direction without a risk of tilting in a forward direction. The spacing members include rotating arms to allow a user to easily access terminals, etc. provided at the rear surface of the display apparatus.

Fixing a wire of the lifting device using VESA holes of the display apparatus eliminates additional processing to form a wire fixing structure, thereby resulting in enhanced fabrication efficiency and reduced costs associated therewith.

Although the exemplary embodiments of the present general inventive concept has been illustrated and described, it would be appreciated by those skilled in the art that various changes may be made in these exemplary embodiments without departing from the principles and spirit of the present general inventive concept, the scope of which is defined in the claims and their equivalents.

What is claimed is:

1. A lifting device usable with a display apparatus to fix the display apparatus to a wall, the display apparatus having a plurality of holes formed in a rear surface thereof, the lifting device comprising:
a pair of fixing units each having an outer periphery surrounding an attachment hole through which each of the fixing units is to be coupled to an attachment surface;
a wire having both ends to be coupled to the pair of fixing units; and
a wire hanger to be coupled to the wire,
wherein the wire is configured to extend outwardly from the outer periphery of each of the fixing units.

2. The lifting device according to claim 1, wherein the pair of fixing units are configured to be coupled to at least a pair of the plurality of holes formed in the rear surface of the display apparatus via the attachment holes.

3. The lifting device according to claim 2, wherein the wire is longer than a horizontal distance between a pair of holes at an upper portion of the rear surface, but shorter than a sum of distances between each of the pair of upper holes and a point where a vertical line passing through a center between the pair of upper holes meets an upper end of the display apparatus.

4. The lifting device according to claim 2, wherein the pair of fixing units are detachably screwed to at least one pair of the plurality of holes disposed in the rear surface of the display apparatus via the attachment holes.

5. The lifting device according to claim 1, further comprising:
spacing members fixed to a pair of lower holes formed at a lower portion of the rear surface of the display apparatus, the spacing members space the rear surface of the display apparatus from the wall by a distance.

6. The lifting device according to claim 5, further comprising:
rotating arms rotatably mounted to the spacing members to tilt the display apparatus.

7. The lifting device according to claim 6, wherein each of the spacing members includes a screw insertion hole to fasten a screw, a supporting portion to control rotation of the corresponding rotating arm, and a buffer member provided at an area which makes contact with the wall.

8. The lifting device according to claim 6, wherein the rotating arms are vertically rotatable to tilt the display apparatus when ends of the rotating arms are supported on the wall via a rotation of the rotating arms.

9. The lifting device according to claim 1, wherein the plurality of holes are VESA holes formed according to video electronics standards association (VESA) wall mount standards.

10. The lifting device according to claim 1, wherein the wire hanger is configured to be attachable to the wall to hang the wire on the wall.

11. The lifting device according to claim 1, wherein the outer periphery of each of the fixing units is provided with an insertion hole from which the wire extends.

12. The lifting device according to claim 11, wherein an end of the wire is guided through the insertion hole of the fixing unit.

13. The lifting device according to claim 11, wherein each end of the wire is provided with an anti-separation portion to be coupled to the insertion hole to prevent the wire from being separated from the fixing unit.

14. The lifting device according to claim 11, wherein each end of the wire is provided with an anti-separation portion to prevent the wire from being separated from the fixing unit.

15. The lifting device according to claim 14, wherein each of the fixing units includes a first case to define the outer periphery, and a second case coupled with the first case to define an interior space adapted to receive the anti-separation portion.

16. The lifting device according to claim 15, wherein the anti-separation portion includes a fixing member having a wire hole through which the wire is guided.

17. The lifting device according to claim 15, wherein the second case is configured to be screwed to at least one of the plurality of holes formed in the rear surface of the display apparatus with a fastening screw.

18. The lifting device according to claim 14, wherein the anti-separation portion has a radius larger than a radius of the wire-insertion hole.

19. The lifting device according to claim 14, wherein the anti-separation portion of the wire forms a locking knot in an interior space of the fixing unit.

20. The lifting device according to claim 1, wherein each of the fixing units includes a buffer member provided at a region thereof in contact with the wall.

* * * * *